(12) United States Patent
Sheaf et al.

(10) Patent No.: US 8,572,984 B2
(45) Date of Patent: Nov. 5, 2013

(54) BREATHER DUCT SHIELDING

(75) Inventors: Christopher T J Sheaf, Derby (GB);
Zahid M Hussain, Derby (GB)

(73) Assignee: Rolls-Royce PLC, London (GB)

( * ) Notice: Subject to any disclaimer, the term of this patent is extended or adjusted under 35 U.S.C. 154(b) by 765 days.

(21) Appl. No.: 12/767,989

(22) Filed: Apr. 27, 2010

(65) Prior Publication Data

US 2010/0293964 A1   Nov. 25, 2010

(30) Foreign Application Priority Data

May 19, 2009  (GB) .................................. 0908540.8
Nov. 2, 2009  (GB) .................................. 0919118.0

(51) Int. Cl.
*F02C 7/06* (2006.01)
*F02C 9/18* (2006.01)

(52) U.S. Cl.
USPC ................ 60/782; 60/785; 60/795; 60/39.08; 60/39.091; 60/801

(58) Field of Classification Search
USPC ............ 60/782, 785, 795, 801, 39.08, 39.091
See application file for complete search history.

(56) References Cited

U.S. PATENT DOCUMENTS

| | | | |
|---|---|---|---|
| 2,041,793 A | 5/1936 | Stalker | |
| 2,248,308 A | 7/1941 | Rice | |
| 2,565,720 A | 8/1951 | Collison et al. | |
| 2,650,781 A | 9/1953 | Taylor | |
| 2,836,463 A | 5/1958 | Wilson | |
| 3,421,577 A | 1/1969 | Valyi | |
| 3,508,561 A | 4/1970 | Cornish, III | |
| 3,525,486 A | 8/1970 | Wimpenny | |
| 3,556,444 A | 1/1971 | Kopp | |
| 3,776,363 A | 12/1973 | Kuethe | |
| 4,038,818 A * | 8/1977 | Snell | 60/226.3 |
| 4,163,366 A | 8/1979 | Kent | |
| 4,478,380 A | 10/1984 | Frakes | |
| 4,529,358 A | 7/1985 | Papell | |
| 4,749,150 A | 6/1988 | Rose et al. | |
| 4,955,565 A | 9/1990 | Coplin | |
| 5,080,303 A | 1/1992 | Hutton | |

(Continued)

FOREIGN PATENT DOCUMENTS

| | | |
|---|---|---|
| EP | 0 439 923 A1 | 8/1991 |
| EP | 0 940 338 A2 | 9/1999 |
| EP | 2 065 303 A2 | 6/2009 |
| GB | 2 446 147 A | 8/2008 |
| WO | WO 2008/045074 A1 | 4/2008 |
| WO | WO 2009/025549 A1 | 2/2009 |

OTHER PUBLICATIONS

Search Report dated Feb. 17, 2010 issued in British Patent Application No. 0919110.7.

(Continued)

*Primary Examiner* — Phutthiwat Wongwian
*Assistant Examiner* — Steven Sutherland
(74) *Attorney, Agent, or Firm* — Oliff & Berridge, PLC

(57) ABSTRACT

A gas turbine engine comprising a nacelle and a breather duct. The breather duct provides communication between a component of the engine within the nacelle and the exterior of the nacelle and opens at an exhaust port on the external surface of the nacelle. There is a clean air outlet slot located downstream of the exhaust port and arranged to expel, in use, a sheet flow of clean air to form an aerodynamic barrier between the external surface of the nacelle and a flow of breather air expelled from the exhaust port.

12 Claims, 4 Drawing Sheets

(56) References Cited

U.S. PATENT DOCUMENTS

| | | | |
|---|---|---|---|
| 5,104,069 A * | 4/1992 | Reising | 244/136 |
| 5,148,989 A | 9/1992 | Skinner | |
| 5,552,576 A | 9/1996 | Giamati | |
| 5,655,732 A | 8/1997 | Frank | |
| 5,803,409 A | 9/1998 | Keefe | |
| 5,988,522 A | 11/1999 | Glezer et al. | |
| 6,116,015 A | 9/2000 | Taylor et al. | |
| 6,425,554 B1 | 7/2002 | Moreland | |
| 6,837,465 B2 | 1/2005 | Lisy et al. | |
| 7,111,809 B1 | 9/2006 | Tai et al. | |
| 7,143,983 B2 | 12/2006 | McClure | |
| 7,510,149 B2 | 3/2009 | Miller et al. | |
| 7,597,288 B2 | 10/2009 | Kwok et al. | |
| 7,832,689 B2 | 11/2010 | Prince et al. | |
| 8,038,102 B2 | 10/2011 | Miller et al. | |
| 8,348,199 B2 | 1/2013 | Sheaf et al. | |
| 8,365,515 B2 * | 2/2013 | Migliaro, Jr. | 60/226.3 |
| 2005/0147497 A1 | 7/2005 | Doerffer et al. | |
| 2006/0249628 A1 | 11/2006 | Turner et al. | |
| 2008/0149205 A1 | 6/2008 | Gupta et al. | |
| 2010/0293917 A1 | 11/2010 | Handley et al. | |

OTHER PUBLICATIONS

Search Report dated Feb. 17, 2010 issued in British Patent Application No. 0919107.3.
Search Report dated Feb. 15, 2010 issued in British Patent Application No. 0919115.6.
U.S. Appl. No. 12/883,553, filed Sep. 16, 2010 in the name of Christopher T.J. Sheaf.
U.S. Appl. No. 12/883,566, filed Sep. 16, 2010 in the name of Christopher T.J. Sheaf.
U.S. Appl. No. 12/883,400, filed Sep. 16, 2010 in the name of Christopher T.J. Sheaf.
Search Report issued in corresponding European Application No. 10 16 1151.5 dated Mar. 4, 2011.
Sep. 7, 2009 Search Report issued in British Patent Application No. GB 0 908 540.8.
Feb. 15, 2010 Search Report issued in British Patent Application No. GB 0 919 118.0.
Jun. 8, 2012 Office Action issued in U.S. Appl. No. 12/883,566.
Jun. 20, 2013 Office Action issued in U.S. Appl. No. 12/883,400.
Aug. 19, 2013 Office Action issued in U.S. Appl. No. 12/883,553.

* cited by examiner

BREATHER DUCT SHIELDING

The present invention relates to shielding of a breather duct of a gas turbine engine.

Aircraft mounted gas turbine engines are usually provided with a gearbox which is driven by the engine and provides drive for certain engine accessories. Such gearboxes are oil lubricated and are provided with so-called "breather" outlets in the form of ducts which provide communication between the gearbox interior and the exterior of the engine. This is to ensure that the operation of the gearbox does not result in an air pressure build-up within the gearbox casing. Inevitably, operation of the gearbox results in severe agitation of the oil within the gearbox to the extent that an oil mist is usually formed. This oil mist can escape through the gearbox breather outlet and so it is common to provide a centrifuge device to separate out the oil mist before it is ejected from the engine. Unfortunately such devices are not completely effective in capturing all of the oil mist so that some oil is inevitably lost through the breather outlet. The magnitude of the oil loss under these circumstances is not great and does not normally present any problems in the effective operation of the gearbox. However the oil which is ejected from the breather outlet, which typically opens at a breather exhaust port which is flush with the surface of the engine nacelle, tends to cause dark coloured stains along the engine nacelle. The problem is particularly acute in the case of nacelles which have a light colour. Such stains are seen as being highly undesirable since they are unsightly and are very difficult and time consuming to remove by normal cleaning methods, causing severe customer irritation.

U.S. Pat. No. 5,080,303 discloses a breather outlet which is in the form of a mast extending outwardly from the engine nacelle, the oil/air mixture from the gearbox being exhausted from the end of the mast remote from the nacelle in a direction generally aligned with the airflow over the nacelle. This has the advantage of exhausting the oil/air mixture away from the nacelle and therefore avoids the staining. However, such masts are of bluff cross-section and cause a significant drag penalty due to shock losses as a consequence of being located in a transonic flow environment at cruise conditions. The mast is also a substantive cast metallic component which adds significant weight and cost. Both these factors penalise overall engine performance.

The present invention seeks to provide a gas turbine engine having a breather duct shield that seeks to address the aforementioned problems.

Accordingly the present invention provides a gas turbine engine comprising a nacelle and a breather duct providing communication between a component of the engine within the nacelle and the exterior of the nacelle, the breather duct opening at an exhaust port on the external surface of the nacelle, and a clean air outlet slot located downstream of the exhaust port and arranged to expel, in use, a sheet flow of clean air to form an aerodynamic barrier between the external surface of the nacelle and a flow of breather air expelled from the exhaust port.

This has the advantage that there is no physical component to block the air flow past the breather exhaust and cause drag, yet the external surface of the nacelle is shielded from the breather air flow.

The component may be an oil lubricated component. The component may be a gearbox, oil lubricated or otherwise.

There may be a second clean air outlet slot located upstream of the exhaust port.

There may be a deflector located adjacent to the clean air outlet slot, the deflector being upstanding and shaped to direct the breather flow away from the external surface of the nacelle. The deflector may be further shaped to direct the breather flow downstream of the exhaust port. The deflector may be straight, arcuate or V-shaped in cross-section. The deflector may comprise a duct to expel clean air at its distal end.

The deflector may further comprise a drainage mechanism. The drainage mechanism may further comprise channels in the deflector surface or at least one drainage duct. The at least one drainage duct may comprise a duct mounted intermediate the edges of the deflector. The at least one drainage duct may comprise a duct mounted at each of the edges of the deflector.

The clean air may be supplied to the clean air outlet from a bypass duct of the engine. Alternatively, the clean air may be supplied to the clean air outlet from an intake close to the exhaust port. The intake may comprise a slot, a NACA intake, or a ram scoop intake. The supply of clean air may be modulated dependent on any one or more of the following factors: the environmental conditions, the mode of engine operation and the mode of operation of the vehicle in which the gas turbine engine is used.

The present invention will be more fully described by way of example with reference to the accompanying drawings, in which.

Figure 1:
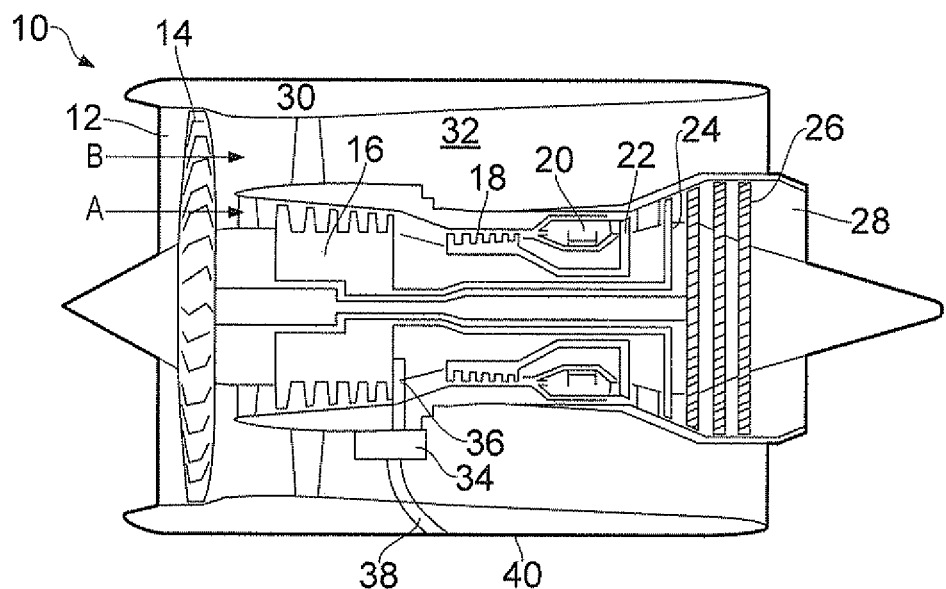
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. An oil lubricated gearbox 34 is mounted on the core engine and extracts power from the intermediate pressure compressor 16 by way of an off-take shaft 36. A breather duct 38 communicates across the bypass duct 32, between the gearbox 34 and the external surface 40 of the nacelle 30.

Figure 2:
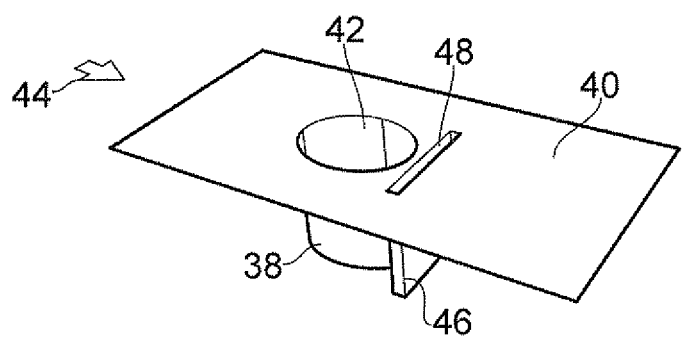
FIG. 2 is a schematic perspective view of a first embodiment of the breather duct shield in accordance with the present invention.

A first embodiment of the present invention is shown in FIG. 2 which is a perspective schematic enlargement of the external surface 40 of the nacelle 30 where the breather duct 38 breaches the surface 40. The breather duct 38 is typically a tube of circular cross-section. As described above, the breather duct 38 is designed to transport air away from the gearbox 34 to prevent air pressure build-up, but the air is often contaminated with an oil mist, despite centrifugal separation. Therefore, there is an oil/air mixture flowing through the breather duct 38 to be expelled through the exhaust port 42 forming the opening of the breather duct 38 through the external surface 40 of the nacelle 30. The oil/air mixture is expelled into an air flow past the engine 10, as indicated by arrow 44, which causes the oil/air mixture to be directed rapidly downstream of the engine 10.

Adjacent the breather duct 38 and located downstream thereof is a clean air outlet duct 46 that breaches the external surface 40 of the nacelle 30 at a clean air outlet slot 48, downstream of and adjacent to the exhaust port 42. Clean air flows through the clean air outlet duct 46 to be expelled from the clean air outlet slot 48 as a sheet flow of clean air that forms an aerodynamic barrier or shield between the external surface 40 of the nacelle 30 and the oil/air mixture forming the breather air expelled from the exhaust port 42 of the breather duct 38.

This is advantageous over the prior art breather mast since there is no physical component blocking the air flow 44 past the engine 10 and thereby causing drag penalties. Additionally the weight and cost of the cast mast is obviated, without adding weight or cost from an alternative component. Thus, overall engine performance is improved.

Figure 3:
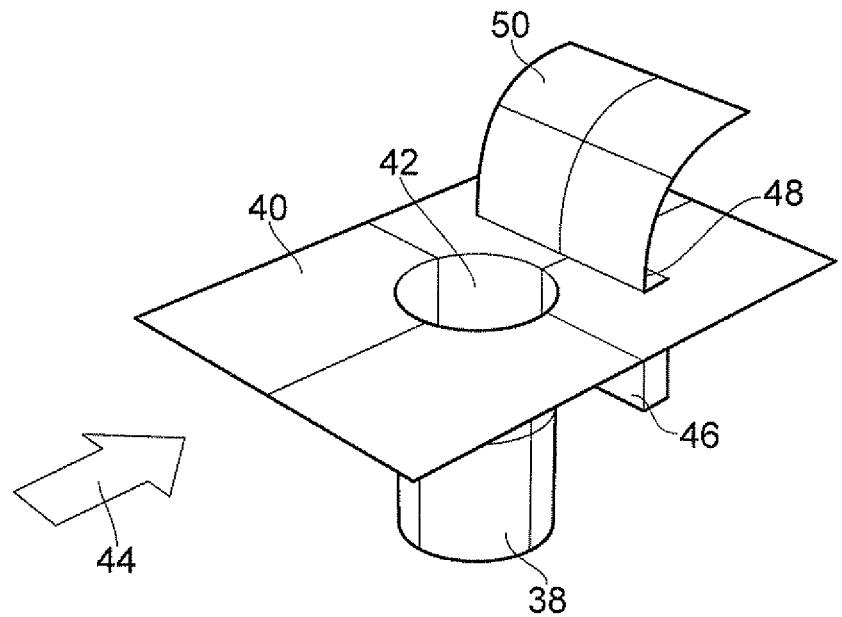
FIG. 3 is a schematic perspective view of a second embodiment of the breather duct shield having a deflector in accordance with the present invention.

FIG. 3 shows a second embodiment of the clean air outlet duct 46 having a deflector 50. The deflector 50 comprises a thin sheet that extends outwardly from the external surface 40 of the nacelle 30 at or proximal to the upstream edge of the clean air outlet slot 48. Preferably the deflector 50 extends across the full width of the clean air outlet slot 48 and is straight in cross-section. Alternatively the deflector 50 may be arcuate in cross-section or some other shape as most appropriate for the specific application. The deflector 50 may have the same or a different shape to the upstream edge of the clean air outlet slot 48.

The deflector 50 is further shaped such that close to the external surface 40 of the nacelle 30 it extends outwardly approximately perpendicular to the external surface 40.

Beyond the initial portion, the deflector 50 curves in the downstream direction so that the breather air expelled through the exhaust port 42 that is redirected downstream by the air flow 44 past the engine 10 is further guided from a radial to an axial direction relative to the engine 10. Thus the deflector 50 extends approximately radially close to the external surface 40 of the nacelle 30 and approximately axially at its distal end.

The deflector 50 also acts to deflect the sheet flow of clean air that is expelled from the clean air outlet duct 46 through the slot 48 so that it is turned from a substantially radial to a substantially axial flow. This has the advantage that mixing between the breather air and the clean air flow is minimised so that the sheet flow of clean air forms a better aerodynamic barrier or shield between the oil/air mixture and the external surface 40 of the nacelle 30. A vortex sheet is created on the downstream surface of the deflector 50, which is more persistent than purely planar flow. As the flow moves downstream the vortices reduce in angular momentum causing vortical sheet to expand, thereby deflecting the oil/air mixture away from the external surface 40 of the nacelle 30.

Figure 4:
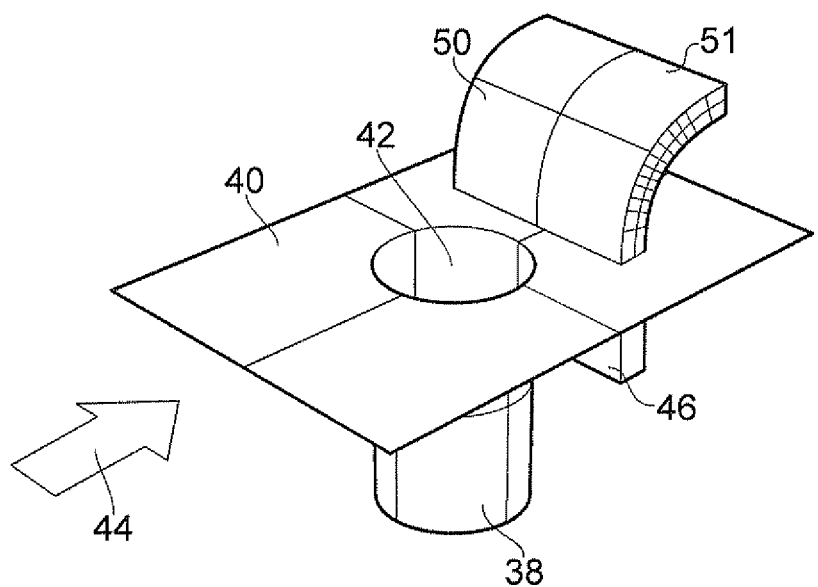
FIG. 4 is a schematic perspective view similar to FIG. 3 having the deflector forming a duct.

A modification of the second embodiment is shown in FIG. 4. The clean air outlet duct 46 extends through the external surface 40 of the nacelle 30 and is formed, on its upstream side, by the deflector 50. The duct terminates in a slot 51 located at the distal end of the deflector 50 to eject a flow of clean air. The flow increases the aerodynamic length of the deflector 50 beyond its physical length. This improves the ability of the deflector 50 to deflect the flow from the exhaust port 42 of the breather duct 38.

Figure 5:
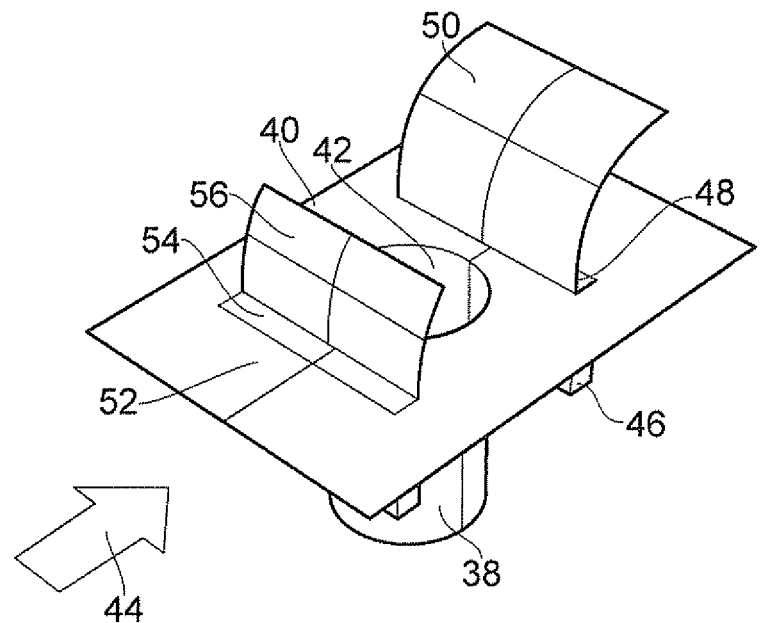
FIG. 5 is a schematic perspective view similar to FIG. 3 and having an upstream slot and deflector.

A further modification of the second embodiment is shown in FIG. 5. A second clean air outlet duct 52 is provided upstream of the breather duct 38 and has similar conformation to the first clean air outlet duct 46. The second clean air outlet duct 52 breaches the external surface 40 of the nacelle 30 at a second clean air outlet slot 54, upstream of and adjacent to the exhaust port 42 of the breather duct 38. The second clean air outlet slot 54 is located to optimise the ejection profile of the flow therefrom. Its location is dependent upon the application.

Extending from the downstream edge of the upstream, second clean air outlet slot 54 is an upstream deflector 56. This has a similar shape to the downstream deflector 50 but is shorter radially and has a less pronounced curve towards the axial direction. The upstream deflector 56 means that the force of the air flow 44 past the engine 10 is deflected from directly contacting the breather air, particularly immediately it is expelled from the exhaust port 42. This is particularly advantageous when the flow rate of the air flow 44 is much greater than the flow rate of the breather air as, otherwise, the air flow 44 past the engine 10 would tend to push the breather air against the downstream deflector 50 and cause oil to be deposited thereon. The second clean air outlet slot 54 increases the aerodynamic length of the upstream deflector 56. The combination of the upstream 56 and downstream 50 deflectors produces less drag than the configuration having just one deflector 50.

Figure 6:
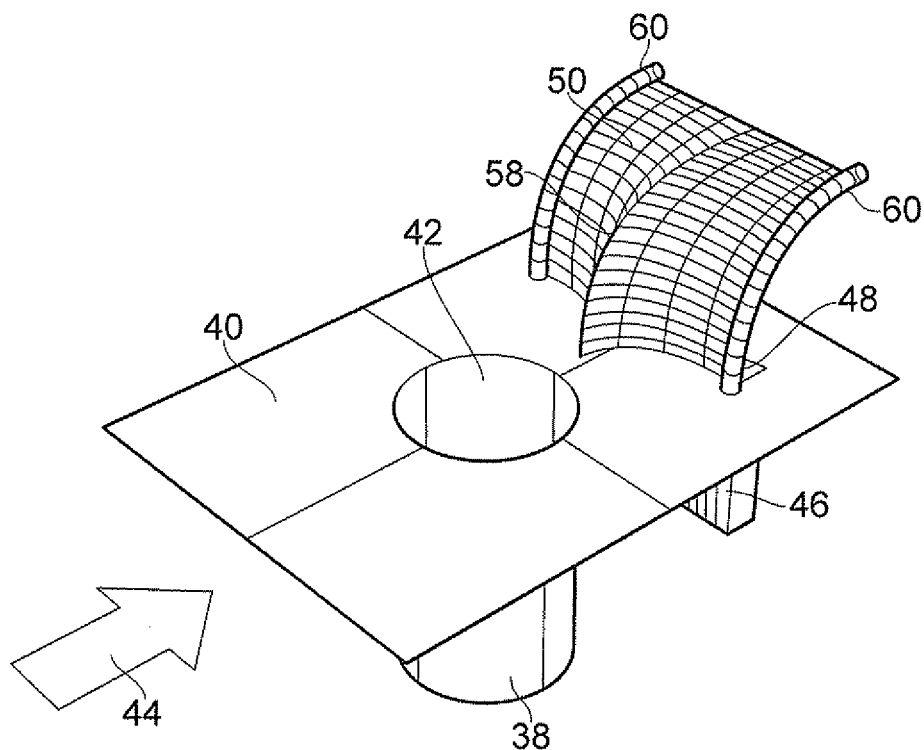
FIG. 6 is a schematic perspective view of a third embodiment of the breather duct shield having a deflector in accordance with the present invention.

FIG. 6 shows a further modification of the aerodynamic breather shield arrangement according to the present invention. In this third embodiment there is no upstream duct 52, slot 54 or deflector 56. The downstream clean air outlet duct 46 is modified from earlier embodiments such that it is V-shaped in cross-section, having the pointed base towards the exhaust port 42 of the breather duct 38. This shape assists the migration of condensed oil from the oil/air mixture to the outer edges of the deflector 50. Similarly, therefore, the clean air outlet slot 48 is V-shaped and the base of the deflector 50, extending from the external surface 40 of the nacelle 30 is V-shaped in cross-section to conform to the shape of the upstream edge of the slot 48. The deflector 50 changes cross-sectional shape between the end adjacent to the external surface 40 of the nacelle 30 and the distal end. At the distal end, the deflector 50 is substantially straight or slightly arcuate in cross-section. There is preferably a smooth transition between the V-shaped and straight or arcuate ends of the deflector 50. The V-shaped base to the deflector 50 causes a central spine 58 to be formed which becomes less pronounced towards the distal end of the deflector 50. Viewed from the upstream side of the deflector 50, the surface of the deflector 50 forms a pair of concave surfaces between the central spine 58 and each edge.

The deflector 50 illustrated in FIG. 6 also comprises a pair of drainage ducts 60 forming or attached to each edge of the deflector 50. These drainage ducts 60 are arranged to collect any oil deposited on the deflector 50 and drain it away into a reservoir or another oil return arrangement. Alternatively, the surface of the deflector 50 may be provided with one or more drainage channels (not shown) that similarly collect deposited oil and drain it into a reservoir or another oil return arrangement.

Although a pair of drainage ducts 60 have been described aligned with the edges of the deflector 50, other arrangements of drainage duct 60 may be contemplated. For example, a single drainage duct 60 could be located along the central spine 58 of the deflector 50, or a central drainage duct 60 may be provided in combination with a pair of edge-mounted drainage ducts 60. The surface of the deflector 50 may be provided with one or more drainage channels and one or more drainage ducts 60 in any configuration suitable for the specific application.

Although the clean air outlet duct 46 in each embodiment is illustrated as extending substantially radially, parallel to the axis of the breather duct 38, the clean air outlet duct 46 may alternatively extend at an angle towards the downstream direction so that the clean air expelled through the clean air outlet slot 48 has a velocity component parallel to the air flow 44 past the engine 10.

The clean air is supplied from any of a number of sources including the bypass duct 32 and bleed air from the engine 10, such as from the intermediate pressure compressor 16. Alternatively the clean air may be supplied from outside the engine 10. Although the clean air supply is described with respect to the first embodiment of the present invention, it will be understood that the same supply mechanisms are applicable to the other embodiments of the present invention and to any modifications thereof within the scope of the claimed invention. The clean air outlet duct 46 may be individually supplied from a source, for example the bypass duct 32, by opening into the source at one end and as the clean air outlet slot 48 at the other. Alternatively, the clean air supply may be brought to a supply reservoir and the clean air outlet duct 46 open into the reservoir instead of the directly into the source.

Figure 7:
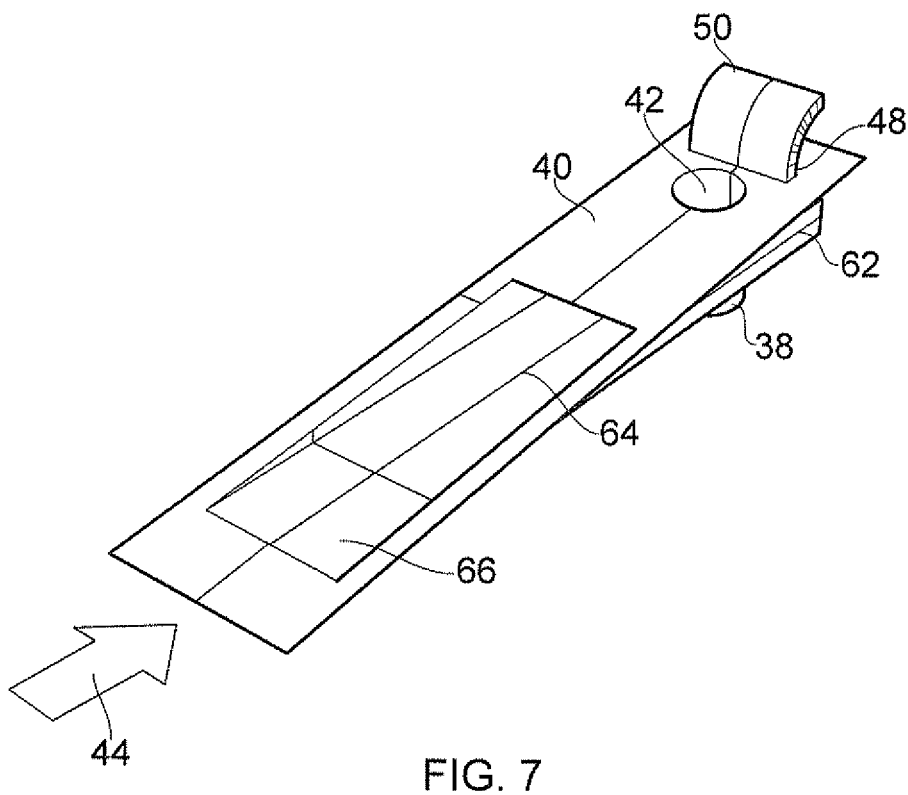
FIG. 7 is a schematic perspective view of the second embodiment of the breather duct shield having a first embodiment of an intake port in accordance with the present invention.
Figure 8:
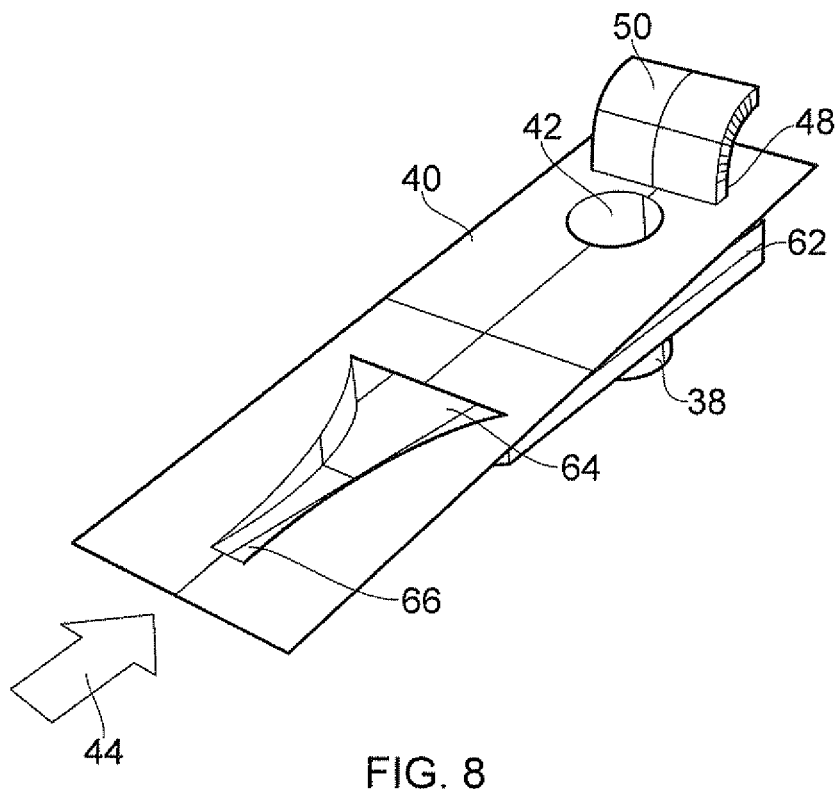
FIG. 8 is a schematic perspective view of the second embodiment of the breather duct shield having a second embodiment of an intake port in accordance with the present invention.

In FIG. 7, the clean air outlet duct 46 terminates, at its distal end to the external surface 40 of the nacelle 30, by opening into a reservoir 62 that supplies clean air to the clean air outlet duct 46. The reservoir 62 is supplied via a supply duct 64 that connects the reservoir 62 with an intake port 66. In the illustrated embodiment, the intake port 66 is located in the external surface 40 of the nacelle 30 upstream of the breather exhaust port 42 and the clean air outlet 46. The intake port 66 may have any of a variety of known forms. For example, it may be a simple inclined slot, as illustrated in FIG. 7, that extends transversely to the air flow 44 past the engine 10. This arrangement of intake port 66 is short and light. Alternatively, the intake port 66 may be a NACA scoop intake, as shown in FIG. 8, having the conventional form wherein the inlet becomes progressively deeper and wider in the direction of the inlet air flow 44. This arrangement of intake port 66 is longer and heavier than the inclined slot, but has a higher pressure recovery. A further alternative form of the intake port 66 is a small ram scoop intake that is oval or rectangular in cross-section and which is cheaper and easier to install than a NACA intake.

It will be appreciated by the skilled reader that any known form of intake port 66 may be used at the opening of the clean air outlet duct 46 into a clear air source such as the bypass duct 32.

Although the breather duct 38 has been described as having circular cross-section, it may have any other cross-sectional shape necessary for the application. The shape of the clean air outlet duct 46 and slot 48 may be modified to match the shape of the breather duct 38 and exhaust port 42. For example, the slot 48 may be wider transversely to the direction of air flow 44 past the engine 10 than the radius of the exhaust port 42 or may be thicker in the downstream direction.

Although the reservoir 62 is depicted as annular and located around the breather duct 38 it may be located away from the breather duct 38 and have any shape desired, for example being cuboid to fit in a space within the nacelle 30.

The gas turbine engine 10 may be used for propulsion of an aircraft.

The supply of clean air may be modulated dependent on any one or more of the following factors: the environmental conditions, the mode of engine operation and the mode of operation of the vehicle, for example the aircraft, in which the gas turbine engine 10 is used.

Although, in the schematic view shown in FIG. 1, the outflow of breather air and clean air is shown as taking place at the bottom of the engine 10, it will be appreciated that the respective ports 42, 48 could be provided at any convenient position around the external surface 40 of the nacelle 30.

Although the clean air outlet duct 46, clean air outlet slot 48 and deflector 50 have been described as V-shaped in accordance with FIG. 6, alternative configurations may be contemplated that have the same effect. For example, the deflector 50 may be arcuate and have an overall convex shape; the duct 46 and slot 48 be shaped in conformity therewith.

The invention claimed is:

1. A gas turbine engine for use with an oil lubricated engine component, the gas turbine engine comprising:
   a nacelle that defines an exterior and an external surface;
   a breather duct providing communication between the engine component within the nacelle and the exterior of the nacelle, the breather duct opening at an exhaust port on the external surface of the nacelle; and
   a clean air outlet slot opening on the external surface of the nacelle, located downstream of the exhaust port, and arranged to expel, in use, a sheet flow of clean air to form an aerodynamic barrier between the external surface of the nacelle and a flow of breather air expelled from the exhaust port.

2. A gas turbine engine as claimed in claim 1, further comprising a second clean air outlet slot located upstream of the exhaust port.

3. A gas turbine engine as claimed in claim 1, further comprising a deflector located adjacent to the clean air outlet slot, the deflector being upstanding and shaped to direct the breather flow away from the external surface of the nacelle.

4. A gas turbine engine as claimed in claim 3 wherein the deflector is further shaped to direct the breather flow downstream of the exhaust port.

5. A gas turbine engine as claimed in claim 3 wherein the deflector is straight in cross-section.

6. A gas turbine engine as claimed in claim 3 wherein the deflector is arcuate in cross-section.

7. A gas turbine engine as claimed in claim 3 wherein the deflector is V-shaped in cross-section.

8. A gas turbine engine as claimed in claim 3 wherein the deflector comprises a duct to expel clean air at its distal end.

9. A gas turbine engine as claimed in claim 3 wherein the deflector further comprises a drainage mechanism.

10. A gas turbine engine as claimed in claim 9 wherein the drainage mechanism comprises at least one drainage duct.

11. A gas turbine engine as claimed in claim 10 wherein the at least one drainage duct comprises a duct mounted at each of the edges of the deflector.

12. A gas turbine engine as claimed in claim 1, wherein the supply of clean air is modulated dependent on any one or more of the following factors: the environmental conditions, the mode of engine operation and the mode of operation of the vehicle in which the gas turbine engine is used.

* * * * *